US010408435B1

(12) United States Patent
Lee et al.

(10) Patent No.: US 10,408,435 B1
(45) Date of Patent: Sep. 10, 2019

(54) MAGNETIC ASSEMBLY STRUCTURE AND LAMP APPARATUS

(71) Applicant: TAIWAN OASIS TECHNOLOGY CO., LTD., New Taipei (TW)

(72) Inventors: Wei-Long Lee, New Taipei (TW); Che-Wei Yeh, New Taipei (TW)

(73) Assignee: TAIWAN OASIS TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/014,182

(22) Filed: Jun. 21, 2018

(51) Int. Cl.
| | |
|---|---|
| *F21V 17/10* | (2006.01) |
| *F21V 17/14* | (2006.01) |
| *H01F 7/20* | (2006.01) |
| *F16B 1/00* | (2006.01) |
| *H01F 7/02* | (2006.01) |

(52) U.S. Cl.
CPC .............. *F21V 17/105* (2013.01); *F16B 1/00* (2013.01); *F21V 17/14* (2013.01); *H01F 7/0231* (2013.01); *H01F 7/20* (2013.01); *F16B 2001/0035* (2013.01)

(58) Field of Classification Search
CPC .... F21V 17/104; F21V 17/108; F21V 17/105; F21V 17/18

USPC ......................................................... 362/374
See application file for complete search history.

(56) References Cited

U.S. PATENT DOCUMENTS

| | | | |
|---|---|---|---|
| 2005/0194930 A1* | 9/2005 | Barbeau .................... | F21L 2/00 320/116 |
| 2012/0194069 A1* | 8/2012 | Wang ....................... | F21S 8/04 315/32 |

\* cited by examiner

*Primary Examiner* — Christopher M Raabe
(74) *Attorney, Agent, or Firm* — Jackson IPG PLLC; Demian K. Jackson

(57) ABSTRACT

A magnetic assembly structure comprises a first main body and a second main body. The first main body comprises at least one first buckle structure. The second main body comprises a tail terminal portion, at least one magnetic attraction unit, at least one second buckle structure and at least one releasing structure. The tail terminal portion, the second buckle structure and the releasing structure form a loop, the first buckle structure is capable of being engaged to the second buckle structure, and the first buckle structure moves in respect to the second buckle structure and the releasing structure. The first buckle structure and the magnetic attraction unit attract each other due to a magnetic attraction effect. By the loop design, merely one directional force is needed to achieve the objective of facilitating assembling and detaching, thus having results of reducing assembling cost and time consumption.

20 Claims, 4 Drawing Sheets

MAGNETIC ASSEMBLY STRUCTURE AND LAMP APPARATUS

BACKGROUND

1. Technical Field

The present disclosure provides a magnetic assembly structure, in particular, to a magnetic assembly structure which utilizes a magnetic attraction effect to make two main bodies be mutually engaged and released along a single one loop direction, and to a lamp apparatus to which the magnetic assembly structure is applied.

2. Description of Related Art

For a current assembling manner of a general object, a magnetic attraction effect is utilized to assemble two components to one object. For example, US Publication 2016/0079701A1 discloses a lamp apparatus comprising a lamp bulb and a lamp base. Each of the lamp bulb and the lamp base has one magnetic in a direction being vertical to the ground. When assembling, due to the magnetic attraction effect of the two magnets, the lamp bulb and the lamp base are fixed for completing the assembling of the lamp apparatus. However, after assembling, the lamp bulb is easily detached from the lamp base to fall on the floor due to the collision or vibration (such as earthquake), which causes the lamp bulb broken out, even damages the person. In one embodiment of US Publication 2016/0079701A1, the lamp bulb and he lamp base have screw threads in the horizontal direction, and the two screw threads can be screwed to each other, so as to prevent the lamp bulb from falling. However, when detaching the lamp bulb from the lamp base, or assembling the lamp bulb to the lamp base, one hand is required to hold the transparent glass portion of the lamp bulb and rotate the lamp bulb with a force, so as to ensure that the lamp bulb is fixed to the lamp base. Unfortunately, the glass portion may have a broken-out danger if the force is over applied.

Take a large tubular lamp as another example, the tubular lamp comprise a tubular main body and a glass lamp mask. The glass lamp mask is screwed via the screw thread or engaged to the front end of the tubular main body. If the glass lamp mask is screwed via the screw thread to the front end of the tubular main body, the object hold by hand should be laid aside when assembling or detaching, and then the right and left hands are used to hold the two sides of the lamp glass mask to rotate of the lamp glass mask. That is, it cannot complete the assembling and detaching by merely one hand, which causes inconvenience. If the glass lamp mask is engaged to the inner side of the tubular main body, to prevent the glass lamp mask from falling, the glass lamp mask and the inner side of the tubular main body should be engaged to each other compactly and tightly. Thus, when detaching, an additional tool should be required to open the glass lamp mask, which causes inconvenience, even makes the damages of the tubular main body and the glass lamp mask due to the destroying of the tool.

According to the technical features in the mentioned related art, to achieve the objective of assembling or detaching, two hands are required to operate simultaneously or a help of a tool is required, which causes time consumption, force consumption and inconvenience, even damages the apparatus. Therefore, how to efficiently facilitate the assembling and detaching of an apparatus by a novel hardware design and how to efficiently reduce the installation cost and expensing time are still the issues which the industrial developer and related research and design person in the assembly structure field continuously try to overcome and solve.

SUMMARY

A main objective of the present disclosure is to provide a magnetic assembly structure, by the loop design and the magnetic attraction effect, merely one directional force of one hand is needed to achieve the objectives of assembling, buckling and detaching, so as to facilitate the assembling and detaching of the assembly structure, and reduce the assembling cost and time consumption. Another one objective of the present disclosure is to apply the magnetic assembly structure to a lamp apparatus, so as to make the lamp apparatus being assembled and detached easily.

To achieve the objective of the present disclosure, a magnetic assembly structure is provided, which comprises: first main body, comprising at least one first buckle structure; and a second main body, comprising a tail terminal portion, at least one magnetic attraction unit, at least one second buckle structure and at least one releasing structure; the second buckle structure has an entrance portion, the entrance portion is coupled to the tail terminal portion, and the second buckle structure is extending to a side of the magnetic attraction unit from the entrance portion; the releasing structure has a steering portion and an exit portion, the exit portion is coupled to the tail terminal portion, the releasing structure and the second buckle structure are jointed at a junction part, the releasing structure is extending to an end of the steering portion from the junction part along an opposite direction of the tail terminal portion, and the releasing structure is extending to the exit portion from one other end of the steering portion; the second main body is extending along a longitudinal direction; wherein the first buckle structure is configured to be engaged to the second buckle structure, the first main body is configured to move in respect to the second main body along the longitudinal direction, and the first buckle structure is configured to attract the magnetic attraction unit mutually due to a magnetic attraction effect.

Regarding the above magnetic assembly structure, wherein the first buckle structure is configured to move in respect to the second buckle structure along the longitudinal direction, and the first buckle structure is further configured to move in respect to releasing structure along the longitudinal direction.

Regarding the above magnetic assembly structure, wherein the second buckle structure is extending along the longitudinal direction of the second main body from the entrance portion.

Regarding the above magnetic assembly structure, wherein the releasing structure is extending to the exit portion along the longitudinal direction from the steering portion.

Regarding the above magnetic assembly structure, wherein the second buckle structure further has a contacting portion, the second buckle structure is extending to the contacting portion along the long the longitudinal direction of the second main body from the entrance portion, and the releasing structure and the contacting portion of the second buckle structure are jointed at the junction part.

Regarding the above magnetic assembly structure, wherein the first buckle structure and the second buckle structure are engaged to each other, and the tail terminal portion, the second buckle structure and the releasing structure form a loop.

Regarding the above magnetic assembly structure, wherein the loop originates from the tail terminal portion, next sequentially passes the entrance portion, the second buckle structure, the contacting portion, the steering portion, the releasing structure and the exit portion, and then comes back to the tail terminal portion, so as to form the loop Regarding the above magnetic assembly structure, wherein the magnetic attraction unit is disposed at a side of the junction part, and the magnetic attraction unit contacts the junction part.

Regarding the above magnetic assembly structure, wherein the first buckle structure is a protrusion block, and the protrusion block is disposed at an outside edge of the first main body; the second buckle structure and the releasing structure are a groove concaved on an inner side wall of the second main body; the groove is configured to accommodate the protrusion block of the first buckle structure, and the protrusion block is configured to move within and along the groove.

The present disclosure further provides a lamp apparatus at least comprising the magnetic assembly structure as mentioned above, wherein the first main body is a lamp mask, the second main body is a lamp case, the second main body or the lamp case is a hollow tubular body, the tail terminal portion of the lamp case is an opening, and the hollow tubular body is configured to accommodate the lamp mask.

Accordingly, the magnetic assembly structure and the lamp apparatus mainly utilize the loop design to achieve the objective of assembling and detaching with merely one directional force of one hand. Thus, no additional tool is required, two hands for simultaneous operation are also not required, and the help of one other person is further not required. The present disclosure makes the assembly structure be assembled and detached easily, and the assembling cost and time consumption are reduced.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
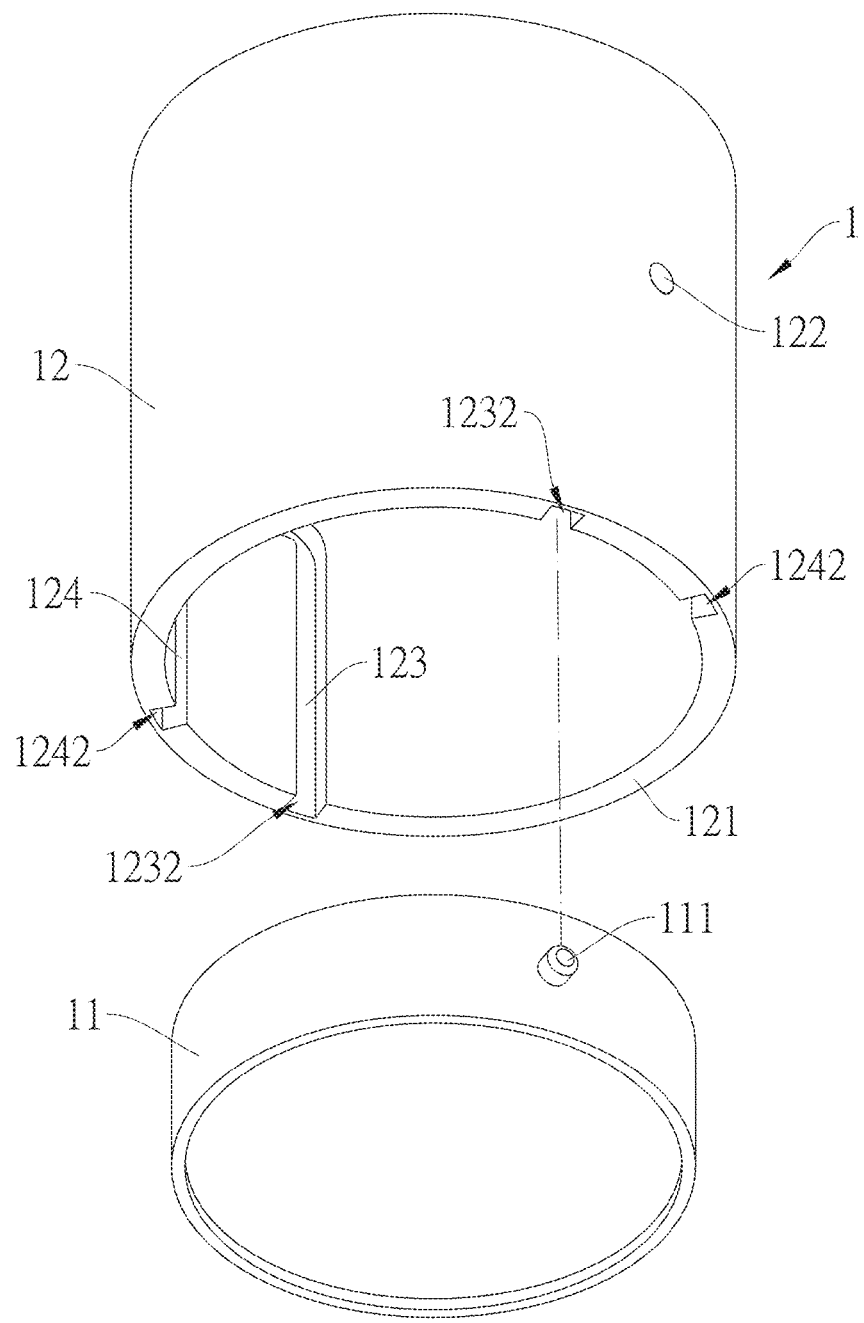
FIG. 1 is a schematic diagram showing a whole architecture of a magnetic assembly structure of the present disclosure.
Figure 2:
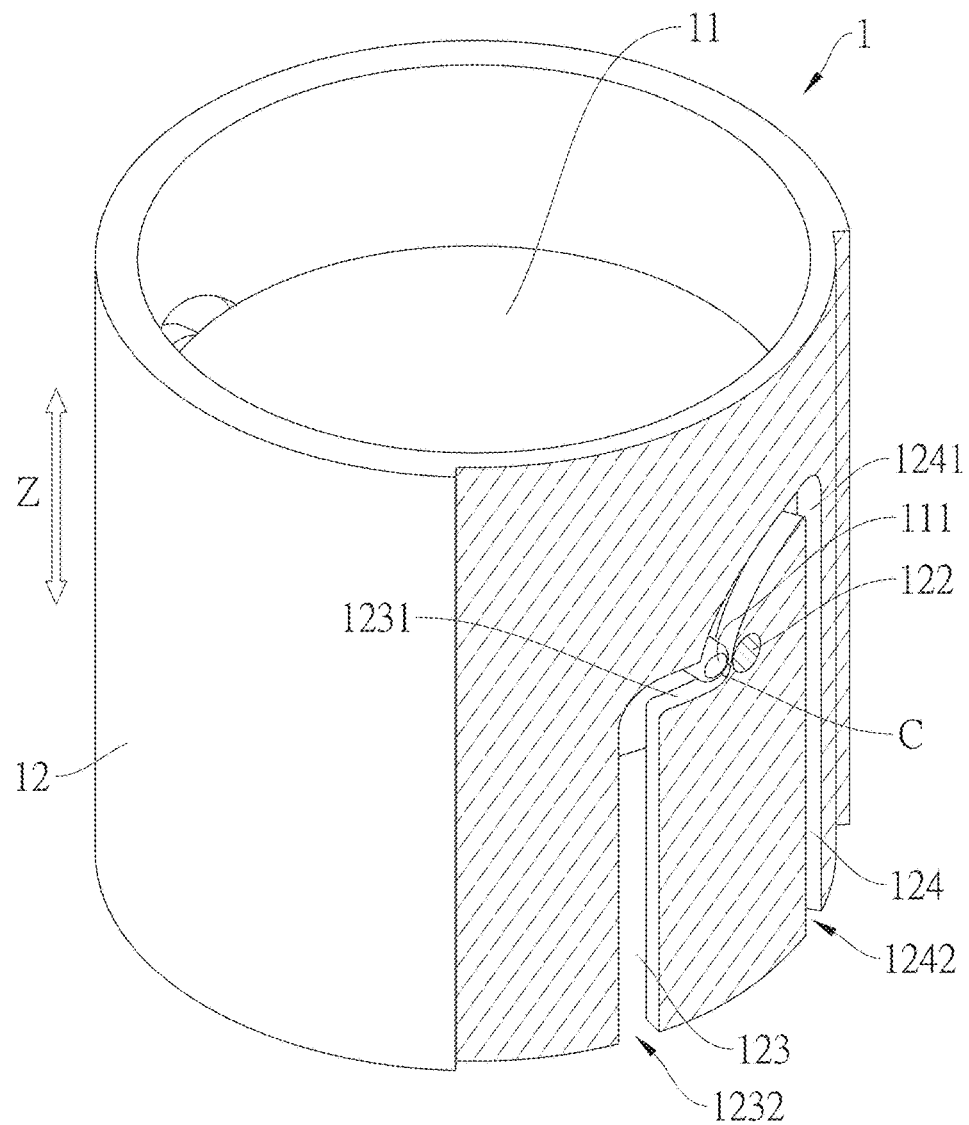
FIG. 2 is a schematic diagram showing an architecture decomposition of the second main body of the magnetic assembly structure of the present disclosure.
Figure 3:
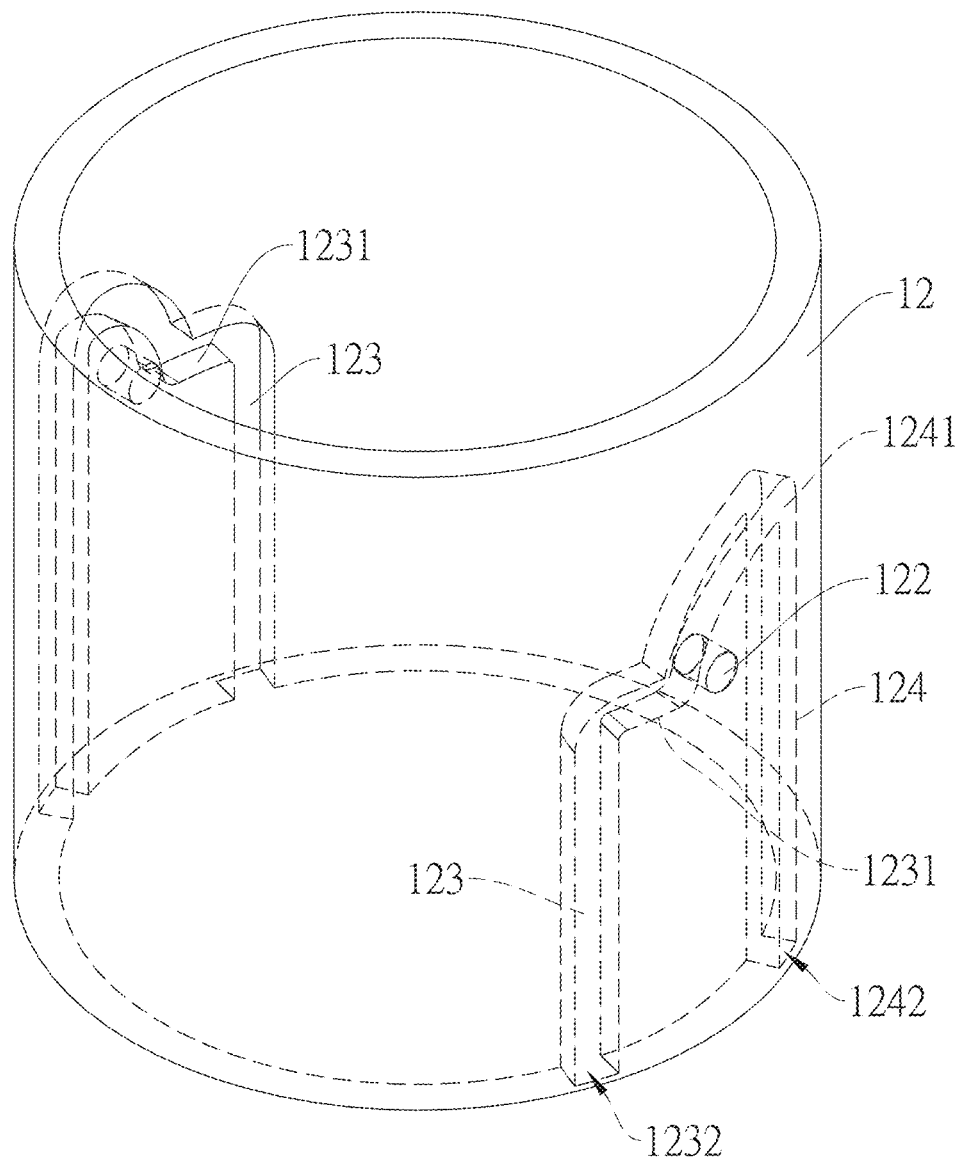
FIG. 3 is a perspective view of the second main body of the magnetic assembly structure of the present disclosure.

To facilitate understanding of the present disclosure, the following descriptions are provided to illustrate exemplary embodiments of the present disclosure together with drawings. It is noted that the following drawings are used for illustration of the present disclosure and not intended to limit the actual dimension, ratio and alignment. Therefore, ratios and allocations of the components in the drawings will not limit the scope of the present disclosure.

Firstly, referring to FIG. 1 through FIG. 4, which illustrate a magnetic assembly structure (1) comprising a first main body (11) and a second main body (12).

The first main body (11) comprise at least one first buckle structure (111) being disposed on an outside edge of the first main body (11). Preferably, the first main body (11) comprises two first buckle structures (111). The two first buckle structures (111) are disposed on an outside edge of the first main body (11) symmetrically. More preferably, the first main body (11) comprises multiple first buckle structures (111). The first buckle structures (111) are disposed and distributed on an outside edge of the first main body (11) symmetrically, uniformly, or with an equal distance therebetween. The first buckle structures (111) are distributed in a ring shape. In the embodiment of the present disclosure, the first buckle structure (111) is a protrusion block.

Figure 4:
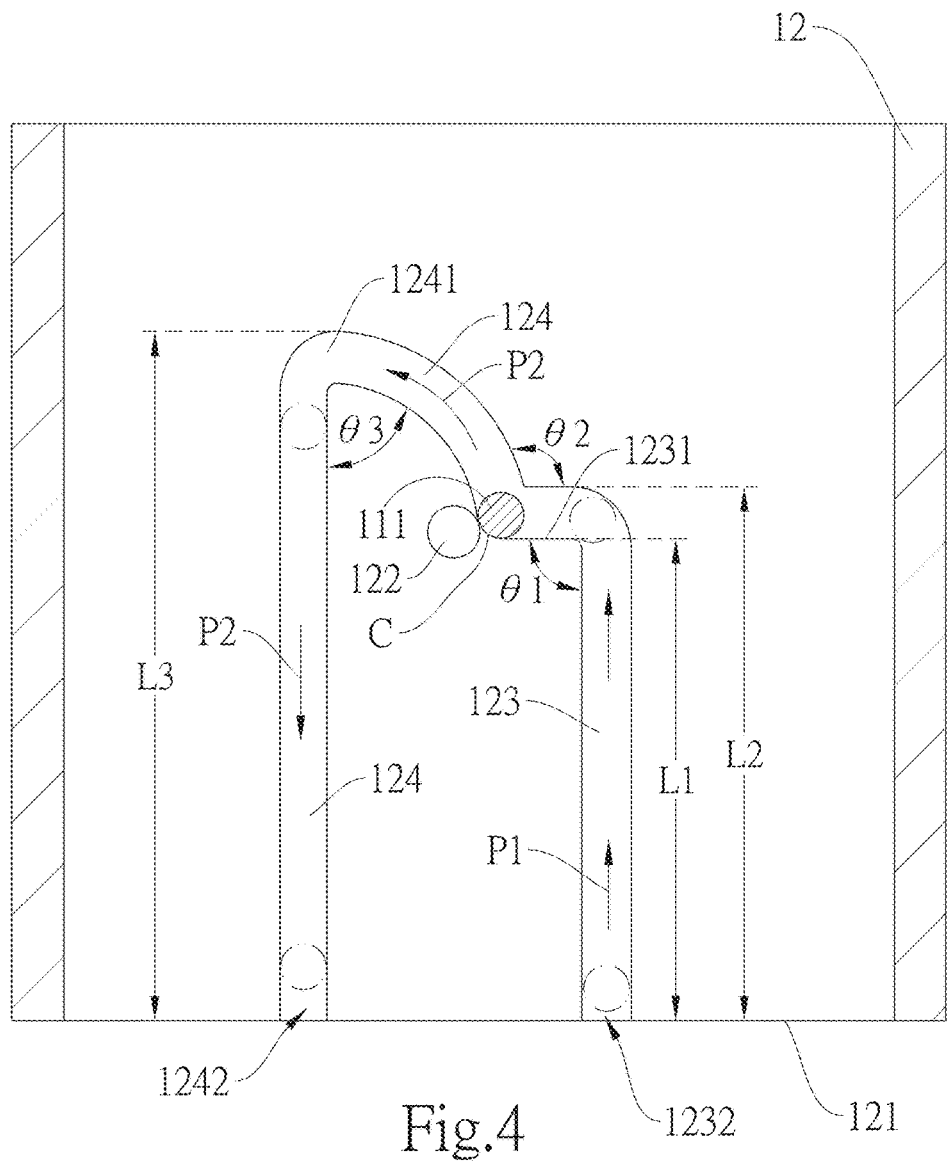
FIG. 4 is a schematic diagram showing a path of the first buckle structure within the second main body of the magnetic assembly structure of the present disclosure.

The second main body (12) comprises a tail terminal portion (121), at least one magnetic attraction unit (122), at least one second buckle structure (123) and at least one releasing structure (124). The second buckle structure (123) has a contacting portion (1231) and an entrance portion (1232), the entrance portion (1232) is coupled to the tail terminal portion (121), the second buckle structure (123) is extending to the contacting portion (1231) from the tail terminal portion (121) and the entrance portion (1232) along a longitudinal direction (Z) of the second main body (12). The second buckle structure (123) is extending to a side of the magnetic attraction unit (122) from the contacting portion (1231). The releasing structure (124) has a steering portion (1241) and an exit portion (1242), the exit portion (1242) is coupled to the tail terminal portion (121), and the releasing structure (124) and the second buckle structure (123) are jointed. The releasing structure (124) is extending to an end of the steering portion (1241) from the junction part (C) along the longitudinal direction (Z) forward the opposite direction of the tail terminal portion (121). The releasing structure (124) is extending to the exit portion (1242) and the tail terminal portion (121) from one other end of the steering portion (1241) along the longitudinal direction (Z). Preferably, the releasing structure (124) is engaged to the contacting portion (1231) and the second buckle structure (123). Referring to FIG. 4, the contacting portion (1231) and the second buckle structure (123) are formed to have a first angle (θ1), and the first angle (θ1) is an acute angle or a right angle. The contacting portion (1231) and the releasing structure (124) are formed to have a second angle (θ2), and the second angle (θ2) is an obtuse angle, a right angle or an acute angle. A lowest point of the contacting portion (1231) and the tail terminal portion (121) are formed to have a first height (L1), and a highest point of the second buckle structure (123) and the tail terminal portion (121) are formed to have a second height (L2), a highest point of the steering portion (1241) and the tail terminal portion (121) are formed to have a third height (L3), the third height (L3) is larger than the second height (L2), and the second height (L2) is larger than the first height (L1).

The tail terminal portion (121), the second buckle structure (123) and the releasing structure (124) form a loop. Specifically, the loop originates from the tail terminal portion (121), next sequentially passes the entrance portion (1232), the second buckle structure (123), the contacting portion (1231), the steering portion (1241), the releasing structure (124) and the exit portion (1242), and then comes back to the tail terminal portion (121), so as to form the loop. It is noted that the magnetic attraction unit (122) is a magnet or an iron product, and the magnet is a permanent magnet or an electromagnet.

The magnetic attraction unit (122), the second buckle structure (123) and the releasing structure (124) are disposed on the inner side of the second main body (12). Preferably, the magnetic attraction unit (122), the second buckle structure (123) and the releasing structure (124) are disposed on the inner side wall of the second main body (12). In the embodiment, the second buckle structure (123) and the releasing structure (124) are a groove concaved on an inner side wall of the second main body (12). The groove is configured to accommodate the protrusion block of the first buckle structure (111), and the protrusion block is configured to move within and along the groove. In other words, the first buckle structure (111) is configured to move in respect to the second buckle structure (123) and the releasing structure (124). The magnetic attraction unit (122) is disposed on the side of the contacting portion (1231), and the contacting portion (1231) may contact or not contact the magnetic attraction unit (122). Preferably, the magnetic attraction unit (122) contacts the contacting portion (1231). The magnetic attraction unit (122) is disposed on the side of the releasing structure (124), and the releasing structure (124) may contact or not contact the magnetic attraction unit (122). The releasing structure (124) is extending to the steering portion (1241) from the side of the magnetic attraction unit (122) along the longitudinal direction (Z) forward the opposite direction of the tail terminal portion (121). Preferably, the magnetic attraction unit (122) contacts the releasing structure (124). Most preferably, the magnetic attraction unit (122) is disposed on the side of the junction part (C) where the contacting portion (1231) of the second buckle structure (123) and the releasing structure (124) are jointed. The magnetic attraction unit (122) contacts the junction part (C). Referring to FIG. 4 again, the steering portion (1241) of the releasing structure (124) is a hook shape, the hook shape has a third angle ($\theta 3$), the first angle ($\theta 1$) is a right angle, the second angle ($\theta 2$) is an obtuse angle, and the third angle ($\theta 3$) is an acute angle.

Preferably, the second main body (12) comprises a tail terminal portion (121), two magnetic attraction units (122), two second buckle structures (123) and two releasing structures (124). The two magnetic attraction units (122) are symmetrically disposed on the inner side wall of the second main body (12), the two second buckle structures (123) are symmetrically disposed on the inner side wall of the second main body (12), and the two releasing structures (124) are symmetrically disposed on the inner side wall of the second main body (12). More preferably, the second main body (12) comprises a tail terminal portion (121), multiple magnetic attraction units (122), multiple second buckle structures (123) and multiple releasing structures (124). The magnetic attraction units (122) are disposed and distributed on the inner side wall of the second main body (12) symmetrically, uniformly, or with an equal distance therebetween; the second buckle structures (123) are disposed and distributed on the inner side wall of the second main body (12) symmetrically, uniformly, or with an equal distance therebetween; and the releasing structures (124) are disposed and distributed on the inner side wall of the second main body (12) symmetrically, uniformly, or with an equal distance therebetween. The magnetic attraction units (122) are distributed in a ring shape, the second buckle structures (123) are distributed in a ring shape, and the releasing structures (124) are distributed in a ring shape.

The first buckle structure (111) is mutually engaged to the second buckle structure (123), and the first buckle structure (111) is configured to move in respect to the second buckle structure (123) along the longitudinal direction (Z). The first buckle structure (111) is further configured to move in respect to the releasing structure (124) along the longitudinal direction (Z). In other words, the first main body (11) is configured to move in respect to the second main body (12) along the longitudinal direction (Z), and the first buckle structure (111) is configured to mutually attract the magnetic attraction unit (122) due to the magnetic attraction effect.

The first buckle structure (111) is a magnet or an iron product. At least one of the first buckle structure (111) and the magnetic attraction unit (122) is the iron product, while one other of the first buckle structure (111) and the magnetic attraction unit (122) is the magnet; or alternatively, both poles of the first buckle structure (111) and the magnetic attraction unit (122) are opposite to each other.

When the present disclosure is implemented, the magnetic assembly structure (1) is for example a lamp apparatus being installed on a ceiling, and the lamp apparatus is a tubular lap for example. The first main body (11) is a lamp mask, and the second main body (12) is a lamp case. The second main body (12) or the lamp case a hollow tubular body, the tail terminal portion (121) of the lamp case is an opening, and the hollow tubular body is configured to accommodate the lamp mask. The first buckle structure (111) is the protrusion block, and the second buckle structure (123) and the releasing structure (124) are a groove concaved on an inner side wall of the second main body (12). When assembling, along an assembling path (P1), the assembling path (P1) can align the first buckle structure (111) to the entrance portion (1232), and make the first buckle structure (111) engaged to the second buckle structure (123). Next, the first main body (11) is pulled up along the second buckle structure (123), i.e. the protrusion block is configured to move within the groove until the first buckle structure (111) reaches the contacting portion (1231). In the embodiment, the first angle ($\theta 1$) is a right angle, the second buckle structure (123) is vertical to the ground, and the contacting portion (1231) is parallel to the ground. Thus, the weight of the first main body (11) can be supported by the contacting portion (1231) via the first buckle structure (111), without falling down. In other words, the weight of the lamp mask is supported contacting portion (1231) via the protrusion block, without falling down. Specifically, the first buckle structure (111) is attracted and fixed by the magnetic attraction unit (122) being disposed on the side of the contacting portion (1231) due to the magnetic attraction effect, so as to achieve the result of buckling and fixing the first buckle structure (111) and the second buckle structure (123). Thus, even when earthquake happens, the first buckle structure (111) cannot fall out the entrance portion (1232) along the reversing direction of the assembling path (P1). Further, since the third height (L3) is larger than the first height (L1), the first buckle structure (111) does not move to the steering portion (1241) to fall out the exit portion (1242) when the earthquake happens. In particular, when the first angle ($\theta 1$) is an acute angle, the first buckle structure (111) further cannot fall out the entrance portion (1232).

When detaching, along a detaching path (P2) being formed next to the assembling path (P1), the detaching path (P2) is allow the first main body (11) to be pull upward continuously, such that the first buckle structure (111) can overcome the magnetic attraction effect mutually generated by the first buckle structure (111) and the magnetic attraction unit (122) from the contacting portion (1231), and further overcome the potential energy difference of the third height (L3) and the first height (L1). Thus, the first buckle structure (111) can be pulled upward to pass the steering portion (1241) along the releasing structure (124). Meanwhile, by the gravity effect affecting the first main body (11), the first buckle structure (111) automatically exits the second main body (12) via the exit portion (1242) along the releasing structure (124).

From the above embodiments, it can be known that, the magnetic assembly structure of the present disclosure mainly utilizes the design of the loop to achieve the objective of easing assembling and detaching with one directional force of one hand, wherein the loop is originating from the tail terminal portion (121), sequentially passing the entrance portion (1232), the second buckle structure (123), the contacting portion (1231), the steering portion (1241), the releasing structure (124) and the exit portion (1242), and then coming back to the tail terminal portion (121). Thus, no additional tool is required, two hands for simultaneous operation are also not required, and the help of one other person is further not required. Furthermore, since the first buckle structure (111) is supported by the contacting portion (1231), the first main body (11) is prevented from falling out. Since the first buckle structure (111) and the magnetic attraction unit (122) generate the magnetic attraction effect, the present disclosure achieve the result of buckling and fixing the first buckle structure (111) and the second buckle structure (123). Thus, the objective of facilitating assembling and detaching for the assembly structure is achieved by the present disclosure, and the present disclosure has results of reducing assembling cost and time consumption.

To sum up, the magnetic assembly structure provided by the present disclosure has been not anticipated by publications or used in public, which meets patentability of the invention. Examination of the present disclosure is respectfully requested, as well as allowance of the present disclosure.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A magnetic assembly structure, at least comprising:
   a first main body, comprising at least one first buckle structure; and
   a second main body, comprising a tail terminal portion, at least one magnetic attraction unit, at least one second buckle structure and at least one releasing structure; the second buckle structure has an entrance portion, the entrance portion is coupled to the tail terminal portion, and the second buckle structure is extending to a side of the magnetic attraction unit from the entrance portion; the releasing structure has a steering portion and an exit portion, the exit portion is coupled to the tail terminal portion, the releasing structure and the second buckle structure are jointed at a junction part, the releasing structure is extending to an end of the steering portion from the junction part along an opposite direction of the tail terminal portion, and the releasing structure is extending to the exit portion from one other end of the steering portion; the second main body is extending along a longitudinal direction;
   wherein the first buckle structure is configured to be engaged to the second buckle structure, the first main body is configured to move in respect to the second main body along the longitudinal direction, and the first buckle structure is configured to attract the magnetic attraction unit mutually due to a magnetic attraction effect.

2. The magnetic assembly structure according to claim 1, wherein the first buckle structure is configured to move in respect to the second buckle structure along the longitudinal direction, and the first buckle structure is further configured to move in respect to releasing structure along the longitudinal direction.

3. The magnetic assembly structure according to claim 2, wherein the second buckle structure is extending along the longitudinal direction of the second main body from the entrance portion.

4. The magnetic assembly structure according to claim 3, wherein the releasing structure is extending to the exit portion along the longitudinal direction from the steering portion.

5. The magnetic assembly structure according to claim 4, wherein the second buckle structure further has a contacting portion, the second buckle structure is extending to the contacting portion along the long the longitudinal direction of the second main body from the entrance portion, and the releasing structure and the contacting portion of the second buckle structure are jointed at the junction part.

6. The magnetic assembly structure according to claim 5, wherein the tail terminal portion the second buckle structure and the releasing structure form a loop.

7. The magnetic assembly structure according to claim 6, wherein the loop originates from the tail terminal portion, next sequentially passes the entrance portion, the second buckle structure, the contacting portion, the steering portion, the releasing structure and the exit portion, and then comes back to the tail terminal portion, so as to form the loop.

8. The magnetic assembly structure according to claim 7, wherein the magnetic attraction unit is disposed at a side of the junction part.

9. The magnetic assembly structure according to claim 8, wherein the magnetic attraction unit contacts the junction part.

10. The magnetic assembly structure according to claim 7, wherein the contacting portion and the second buckle structure are formed to have a first angle, and the first angle is an acute angle or a right angle.

11. The magnetic assembly structure according to claim 7, wherein the contacting portion and the releasing structure are formed to have a second angle, and the second angle is an obtuse angle, a right angle or an acute angle.

12. The magnetic assembly structure according to claim 7, wherein the steering portion of the releasing structure is a hook shape, the hook shape has a third angle, and the third angle is an acute angle.

13. The magnetic assembly structure according to claim 7, wherein the contacting portion and the second buckle structure are formed to have a first angle, the contacting portion and the releasing structure are formed to have a second angle, the steering portion of the releasing structure is a hook shape, the hook shape has a third angle, the first angle is a right angle, the second angle is an obtuse angle, and the third angle is an acute angle.

14. The magnetic assembly structure according to claim 7, wherein a lowest point of the contacting portion and the tail terminal portion are formed to have a first height, and a highest point of the second buckle structure and the tail terminal portion are formed to have a second height, a highest point of the steering portion and the tail terminal portion are formed to have a third height, the third height is larger than the second height, and the second height is larger than the first height.

15. The magnetic assembly structure according to claim 7, wherein the magnetic attraction unit is a magnet or an iron product, the first buckle structure is a magnet or an iron product; at least one of the first buckle structure and the magnetic attraction unit is an iron product, and one other of the first buckle structure and the magnetic attraction unit is a magnet; or alternatively, both poles of the first buckle structure and the magnetic attraction unit are opposite poles.

16. The magnetic assembly structure according to claim 15, wherein the first buckle structure is a protrusion block, and the protrusion block is disposed at an outside edge of the first main body; the second buckle structure and the releasing structure are a groove concaved on an inner side wall of the second main body; the groove is configured to accommodate the protrusion block of the first buckle structure, and the protrusion block is configured to move within and along the groove.

17. A lamp apparatus, at least comprising the magnetic assembly structure according claim 16, wherein the first main body is a lamp mask; the second main body is a lamp case, the second main body or the lamp case is a hollow tubular body, the tail terminal portion of the lamp case is an opening, and the hollow tubular body is configured to accommodate the lamp mask.

18. A lamp apparatus, at least comprising a magnetic assembly structure, and the magnetic assembly structure at least comprising:
   a first main body, comprising multiple first buckle structures, and the first buckle structures are disposed and distributed at an outside edge of the first main body with an equal distance therebetween;
   a second main body, comprising a tail terminal portion, multiple magnetic attraction units, multiple second buckle structures and multiple releasing structures; the magnetic attraction units are disposed and distributed at an inner side wall of the second main body with an equal distance therebetween, the second buckle structures are disposed and distributed at an inner side wall of the second main body with an equal distance therebetween, and the releasing structures are disposed and distributed at an inner side wall of the second main body with an equal distance therebetween; the second buckle structure has an entrance portion, the entrance portion is coupled to the tail terminal portion, the second buckle structure is extending to a side of the magnetic attraction unit from the entrance portion; the releasing structure has a steering portion and an exit portion, the exit portion is coupled to the tail terminal portion, the releasing structure and the second buckle structure are jointed at a junction part, the releasing structure is extending to an end of the steering portion from the junction part along an opposite direction of the tail terminal portion, and the releasing structure is extending to the exit portion from one other end of the steering portion; the second main body is extending along a longitudinal direction;
   wherein the first buckle structure is configured to be engaged to the second buckle structure, the first buckle structure is configured to move in respect to second buckle structure along the longitudinal direction, the first buckle structure is further configured to move in respect to releasing structure along the longitudinal direction, and the first buckle structure is configured to attract the magnetic attraction unit mutually due to a magnetic attraction effect;
   wherein the first main body is a lamp mask; the second main body is a lamp case, the second main body or the lamp case is a hollow tubular body, the tail terminal portion of the lamp case is an opening, and the hollow tubular body is configured to accommodate the lamp mask.

19. The lamp apparatus according to claim 18, wherein the first buckle structures are distributed in a ring shape.

20. The lamp apparatus according to claim 19, wherein the magnetic attraction units are distributed in a ring shape, the second buckle structures are distributed in a ring shape, and the releasing structures are distributed in a ring shape.

* * * * *